June 3, 1941.   C. M. STROUD   2,244,088

CONSTANT LEVEL VALVE

Filed Feb. 26, 1938

Inventor
Charles M. Stroud

By Howard Fischer
Attorney

Patented June 3, 1941

2,244,088

UNITED STATES PATENT OFFICE 2,244,088

CONSTANT LEVEL VALVE

Charles M. Stroud, Minneapolis, Minn.

Application February 26, 1938, Serial No. 192,807

6 Claims. (Cl. 137—139)

My invention relates to an improvement in constant level valves wherein it is desired to provide a valve construction which is capable of maintaining a constant level feed of liquid.

Many types of float valves have been previously constructed for accomplishing somewhat similar results to the one accomplished herewith. Usually, however, this type of valve is provided with an actuating means in the form of an electrical solenoid or the like, so that when a circuit is closed, the solenoid will open a valve to permit liquid to flow therefrom. It may be seen that this former construction necessitated instantaneous action in the opening and closing of the valve.

It is a purpose of the present invention to provide a valve which is actuated by thermostatically controlled mechanism in such a way that the valve is opened gradually when the flow of liquid through the valve is desired. Thus this valve may be used upon devices where a gradual flow of liquid through the valve is highly desirable and where a sudden flow of liquid therethrough is disadvantageous.

It is a purpose of my invention to provide a valve operated by a thermostatically actuated arm which in turn is operated by a heating element. When it is desired to turn on the valve the heating element is actuated, which causes gradual flexing of the thermostatically actuated arm, which arm actuates the valve.

It is a further feature of my invention to equip this thermostatically operated arm with a contact means by which the heating element may be turned off after the valve has been turned completely on. When the blade cools sufficiently this contact again is closed to the heating element. This flexing back and forth takes place until the current supply is broken at some other point, whereupon the thermostatic arm is permitted to move the valve into closed position to stop the flow of liquid therethrough.

It is a purpose of my invention to provide a valve within which the liquid is maintained at a constant level by means of a suitable float. This float controls a needle valve arrangement provided with a double seat. Thus the valve is so designed as to provide two separate sealing means for liquid entering the float chamber either of which is capable by itself of stopping the flow of liquid. Accordingly, even though foreign material may enter the valve and prevent one portion of my valve from sealing, the other seal will effectively stop the flow of liquid into the float chamber.

These and other objects and novel features of my invention will be more clearly and fully set forth in the following specification and claims.

In the drawing forming a part of my specification:

Figure 1:
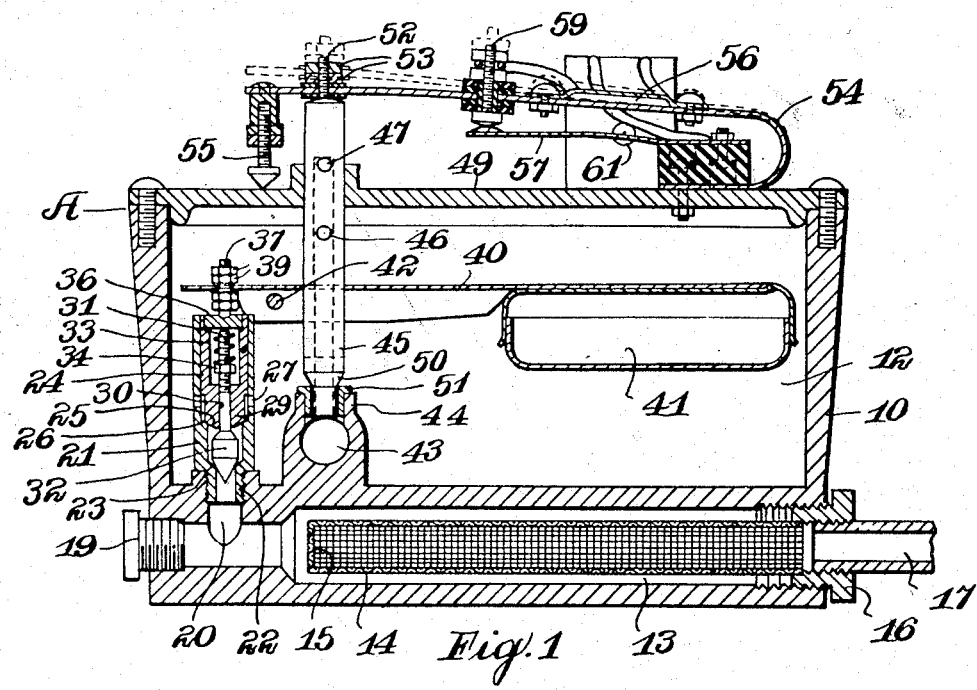
Figure 1 is a longitudinal section centrally through my valve showing the arrangement of the parts thereof.

The valve A comprises a valve body 10 having a float chamber 12 therein. Beneath the float chamber 12 I provide a cylindrical passageway 13 which accommodates a screen sleeve 14 having a closed end 15. This screen sleeve 14 is secured to a bushing 16 which is threaded into one end of the passageway 13 and within which a pipe 17 may be threaded leading to the source of oil supply.

A plug 19 preferably closes the end of the passageway 13 opposite to that containing the bushing 16. A vertical passage 20 communicates with the passageway 13. A needle valve casing or sleeve 21 is threaded into the vertical passage 20. This casing 21 is provided with a central liquid passage 22 communicating with the passage 21, and a valve seat 23 surrounds the passage 22 at the top of the same.

A valve plunger 24 fits slidably within the upper portion of the valve casing 21. This plunger 24 is provided with a tapered end 25 engageable with a seat 26 formed in the casing 21. Openings 27 are provided through the casing 21 above the seat 26 and the lower portion 29 of the plunger 24 is reduced in diameter to some extent to permit liquid to flow past this lower portion 29 and through the openings 27 into the float chamber 12 when the plunger 24 is removed from the seat 26.

The plunger 24 is provided with a central aperture 30 to accommodate the valve rod 31. This rod 31 is provided with a tapered valve 32 at the lower-most extremity thereof. An aperture of enlarged diameter 33 communicates with the opening 30 and an adjusting nut 34 is threaded on to the rod 31. A spring 35 is interposed between the nut 34 and the end plug 36 of the valve plunger 24. The end plug is inserted forcibly in the end of the plunger completely sealing this end when the rod 31, nut 34 and spring 35 are in place therein.

A threaded shank 37 extends from the top of the plunger 36 and nuts 39 on this shank 37 or stud engage on either side of the lever arm 40 supporting the float 41. The lever arm 40 is pivoted at 42 so that upward movement of the float 41 forces the plunger 24 downwardly within the casing 21.

The outlet 43 of the float chamber 12 is provided with an upwardly extending boss 44 within which the needle valve 45 may engage. This needle valve 45 is hollow and is provided with vents 46 and 47 which are above the level of liquid within the float valve and outside of the top 49 of the float chamber 12. The air pressure within and without the float chamber 12 is thus equalized and liquid is permitted to flow from the exhaust opening due to the entrance of air through the vents 46 and 47, even after the valve 45 has been closed.

The rod 45 is provided with a tapered valve portion 50 which engages an adjustable seat 51 on the top of the boss 44. Thus when the valve rod 45 is raised, liquid may flow through the outlet 43 and when it is in lowered position, the liquid is sealed within the float chamber 12.

A stud 52 extends from the top of the valve rod 45 and is connected by nuts 53 to an arm 54 formed of thermostatic material. This arm 54 is arranged to raise into the dotted line position in Figure 1 when heat is applied thereto, thus raising the needle valve 45. The lower limit of movement of the arm 54 is regulated by the adjusting screw 55. A heating element 56 is secured to a suitable source of current supply, one connection thereto extending through the contact blade 57 and the contact 59 on the arm 54. When the arm 54 is in the lowered position illustrated in Figure 1, the contact arm 57 is in engagement with the contact 59. Thus when current is applied through an external switch 60, a circuit is formed through the heating element 56, the blade 57, and the contact 59. The heat created by the element 56 causes the blade 54 to raise into the dotted outline position illustrated in Figure 1. The needle valve 45 is thus raised permitting liquid to flow through the exhaust or outlet opening 43. When the arm 54 reaches a predetermined position, the contact 59 moves out of engagement with the contact arm 57 thus breaking the circuit to the heating element 56. Gradual cooling of the arm 54 causes this arm to flex down toward the full line position. As it moves, the contact 59 again engages the contact arm 57 and the circuit to the heating element is again closed. This movement takes place until the circuit is broken through the switch 60 whereupon the heating element 56 will not be heated as the contact 59 engages the arm 57. The arm 54 then goes back to the position illustrated in full lines in Figure 1. The position at which the contact 59 will disengage the arm 57 may be regulated by means of the adjusting screw 61 having a tapered end which engages the blade or arm 57.

Figures 3, 4:
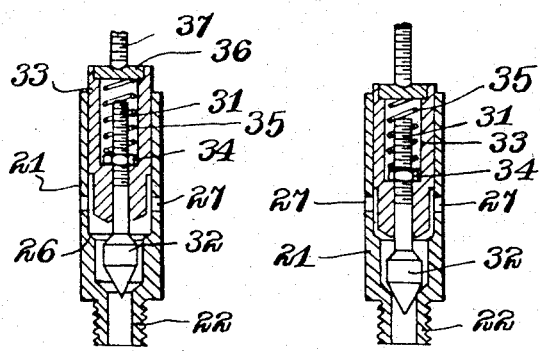
Figure 3 is a cross-sectional view through the needle valve showing the same in open position.
Figure 4 is a view similar to Figure 3 showing one of the needle valves in seated position.
Figure 5:
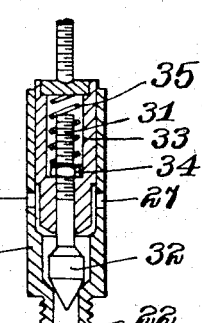
Figure 5 is a diagram of the wiring of my valve.
Figure 2:
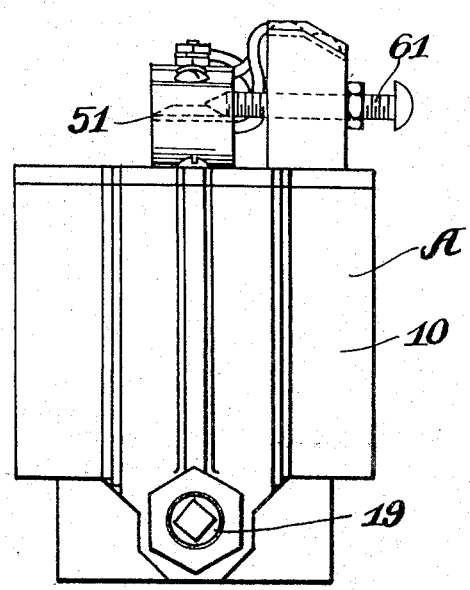
Figure 2 is an end view of my valve.

In operation, the liquid flows in through the pipe 17, through the screen 14 and passageways 20 and 22. If insufficient liquid is present in the float chamber 12, the float will be lowered, pulling the plunger 24 upwardly and disengaging the plunger from its seat 26 and disengaging the valve 32 from its seat 23. Liquid will then flow past the valve 32 and the restricted end 29 of the plunger 24 and into the float chamber through the openings 27. The float chamber gradually fills, raising the float 41 and lowering the plunger 24 until the position indicated in Figure 4 of the drawing is reached. In this position, the valve member 32 is in engagement with the seat 23 preventing the flow of liquid therefrom. If, however, foreign matter has been lodged upon the seat 23 of this valve, preventing the complete closure thereof, further upward movement of the float 41 lowers the plunger 24 to a greater extent until the tapered end 25 of this plunger 24 engages the seat 26 on the casing 21. Thus even though one of the valve seats does not fit properly, due to foreign substance becoming lodged thereupon, the other of the valves will act to close the inlet of liquid. The outlet of liquid from the float chamber is regulated entirely by the thermostatically controlled arm. When the valve is in the position illustrated in Figure 3 of the drawing, liquid may flow into the valve chamber, while when in the position indicated in Figure 1 the valve is entirely closed.

From the foregoing description it will be clear that my valve A is particularly adapted for use for controlling oil burners or the like where a predetermined maximum and a predetermined minimum flow is desired. By proper adjustment of the set screw 55, the arm 54 may be regulated so that when the heating element 56 is turned off, the needle valve 45 will not seat completely upon the adjustable seat 51, thus permitting a small minimum amount of liquid to pass through the outlet 43. By adjustment of the adjustment screw 61, the blade 57 may be regulated to stop movement of the arm 54 when a predetermined maximum flow has been reached, raising the needle valve 45 just sufficiently to permit the maximum amount of liquid desired to flow through the outlet 43. Thus the screws 55 and 61 form a high and low adjustment for the liquid passing through the valve to maintain a predetermined maximum and minimum flow.

The minimum flow provided by the screw 55 permits a small amount of oil to flow through the outlet acting as a supply for a pilot light which maintains a constant low flame. Adjustment of the screw 61 adjusts the maximum flow, which may be increased if desired in cold weather. The valve fluctuates gradually between these limits to gradually increase or decrease the flame of the burner. The fluctuation of the arm 54 provides a gradual change in the opening and closing of the valve, which movement is entirely silent. It will be understood that former devices employing solenoids provided a considerable hum due to the alternating current in most installations. The silent action of my valve is an added feature of advantage of my valve.

In accordance with the patent statutes, I have described the principles of construction and operation of my constant level valve, and while I have endeavored to set forth the best embodiment thereof, I desire to have it understood that this is only illustrative of a means of carrying out my invention, and that obvious changes may be made within the scope of the following claims without departing from the spirit of my invention.

I claim:

1. A valve comprising a liquid outlet, means for regulating the flow of liquid through said outlet and thermostatically operated means for actuating said regulating means, said thermostatically actuated means including a heating element for actuating said thermostatically actuated means, a circuit to said heating element, and a spring switch blade resiliently engaged by said thermostatically actuated means and disengageable therefrom for breaking said circuit when said thermostatic element has operated said regulating means to a predetermined extent.

2. A valve comprising a liquid outlet, a needle valve controlling the flow through said outlet, a bi-metallic arm connected to said needle valve to actuate the same, heating element means for moving said bi-metallic arm, a contact mounted on said arm, a circuit to said heating element, and spring switch blade means in said circuit co-operable with said contact and movable with said arm through a part of its movement and breaking said circuit when said bi-metallic arm moves a predetermined amount.

3. A valve for use in a liquid outlet comprising a needle valve, an arm of bi-metallic material supporting said needle valve to move the same, means for limiting the closing of this valve, a heating element for heating said bi-metallic arm for opening said valve, a spring switch blade co-operable with said arm for breaking the circuit to said heating element upon a predetermined movement of said bi-metallic arm, and means for adjusting the position of said circuit breaking means to cause the circuit to be broken upon any desired degree of movement of said bi-metallic arm.

4. A valve comprising a casing, an inlet and an outlet to said casing, a needle valve in said outlet passing through said casing, means for moving said needle valve, and a passage within said needle terminating outside of said casing and having an opening within said casing to equalize pressure outside and inside of said casing.

5. A valve comprising a casing, an inlet thereto, an outlet therefrom, a hollow needle valve in said outlet extending through said casing, means controlling the level of liquid in said casing, means secured to said needle valve to regulate the outlet, said needle valve having openings therein from the hollow center thereof to a point within said casing above said liquid level, and from said hollow center to the outer atmosphere outside said casing.

6. A valve comprising a casing, an inlet and an outlet to said casing, a needle valve in said outlet extending through said casing, a substantially J-shaped bi-metallic member mounted on said casing having connected long and short arms, with the long arm of the J secured to said needle valve, a heating element for actuating said long arm, and a spring contact engageable with said long arm, said arm movable out of contact with said spring contact in one extreme position, and a circuit to said heating element extending through said spring contact and said member.

CHARLES M. STROUD.